United States Patent

[11] 3,564,345

[72] Inventor Joseph S. Baynard, Jr.
Burlington, N.C.
[21] Appl. No. 702,229
[22] Filed Feb. 1, 1968
[45] Patented Feb. 16, 1971
[73] Assignee Western Electric Company Incorporated
New York, N.Y.

[54] BISTABLE CIRCUIT
6 Claims, 2 Drawing Figs.

[52] U.S. Cl. .......... 317/140, 317/148.5; 307/252
[51] Int. Cl. .......... H01h 47/32
[50] Field of Search .......... 317/148.5, 148.5B, 139, 140; 340/168; 307/252, 305; 315/340

[56] References Cited

UNITED STATES PATENTS

| | | | |
|---|---|---|---|
| 3,147,419 | 9/1964 | Cope | 318/129 |
| 3,189,759 | 6/1965 | Laishley | 307/252 |
| 3,330,992 | 7/1967 | Perrins | 317/11 |
| 3,372,288 | 3/1968 | Wigington | 307/252 |
| 1,917,418 | 7/1933 | Almquist et al. | 317/142 |

FOREIGN PATENTS

| | | | |
|---|---|---|---|
| 1,432,592 | 2/1966 | France | 307/252 |

*Primary Examiner*—Lee T. Hix
*Assistant Examiner*—C. L. Yates
*Attorneys*—H. J. Winegar, R. P. Miller & S. Gundersen

ABSTRACT: A bistable circuit in which a normally unactuated silicon controlled rectifier is serially connected with a fixed resistor and the coil of a relay. Depression of a control switch forward biases the gate of the rectifier to initiate conduction and the subsequent release of the control switch shorts out the series resistor to actuate the relay. Actuation of the relay connects the control switch across the rectifier and a subsequent depression of the switch stops conduction through the rectifier. Release of the control switch then deactuates the relay.

INVENTOR
J. S. BAYNARD JR.
By D. W. Marko
ATTORNEY

BISTABLE CIRCUIT

BACKGROUND OF THE INVENTION

1. Field of Invention

The invention relates to bistable circuits. One problem encountered in the design of bistable circuits is that spurious voltage transients may effect a change of state in the circuit and produce an erroneous output. Additionally, it may be necessary to control a plurality of different loads with a single bistable circuit, Finally, for some purposes it is desirable that a bistable circuit return to a particular initial state in the event of power failure so that there is always certainty as to the condition of the circuit when power is reapplied.

2. Description of the Prior Art

In the past many different bistable circuits have been constructed using purely electronic elements, relays, or a combination of the two. Most of these circuits have, however, been characterized by either their complexity, susceptibility to operation by spurious signals, inability to control large amounts of current, lack of reliability, or slowness of operation.

SUMMARY OF THE INVENTION

An object of this invention is a new and improved bistable circuit. In one embodiment of the circuit, the transconductive path of a thyratronlike electronic device is combined with an output means having two stable states and an externally variable resistance. A control switch, having two conditions, is operable into its first condition when the electronic device is nonconductive, to energize the device and initiate conduction. Return of the control switch to its second condition reduces the value of the variable impedance which actuates the output means, and thereby the bistable circuit, to its second state. Subsequent operation of the control switch to its first condition interrupts the operating path of the electronic device and extinguishes condition. Return of the control switch to its second condition interrupts the operating path of the output means and returns the bistable circuit to its first state.

BRIEF DESCRIPTION OF THE DRAWING

The nature of the present invention and its various advantages will appear more fully by referring to the following detailed description in conjunction with the appended drawing, in which.

DETAILED DESCRIPTION

Figure 1:
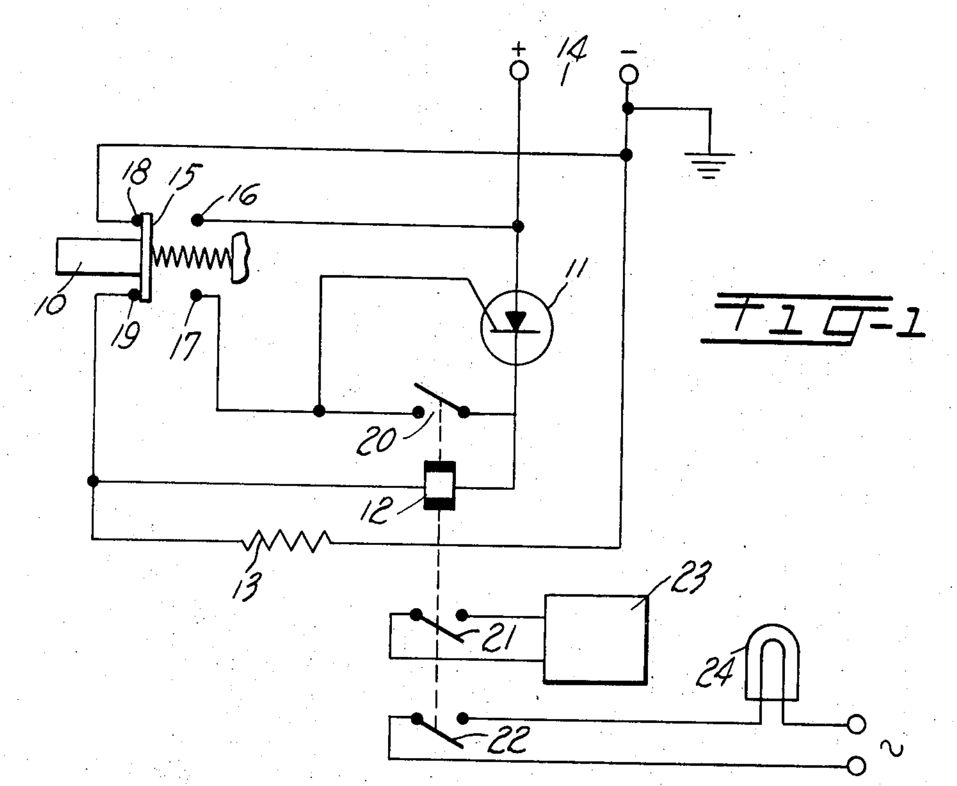
FIG. 1 is a schematic drawing of a bistable circuit constructed in accordance with the invention.

Referring now in more detail to the drawing, in FIG. 1 there is shown a relay flip-flop circuit which is operated by a pushbutton switch 10. The circuit includes a silicon controlled rectifier SCR 11, a relay 12, and a resistor 13, all serially connected across a DC voltage source 14 to form a transconductive path for the SCR 11. The polarity of voltage source 14 is chosen to bias the anode of the SCR 11 positive with respect to the cathode. The value of the resistor 13 is chosen such that when the SCR 11 is conductive, the current through the relay 12 and the resistor 13 is smaller than the current required to actuate the relay 12, but greater than the holding current required to maintain the relay 12 in its actuated position. For example, the relay 12 may required 100 milliamperes of current to actuate or close its contacts, but may only require 40 milliamperes of current to maintain its contacts in their actuated positions. The value of the resistor 13 is chosen to limit the current through the relay 12 to a value greater than 40 but less than 100 milliamperes.

The pushbutton switch 10 has two states or conditions. In the first state, when depressed, a metal bar 15 engages contacts 16 and 17 to connect the voltage source 14 to the control electrode of the SCR 11 to trigger the SCR into its conductive state when the relay 12 is not actuated. When the switch 10 is in its second state or released, the bar 15 engages contacts 18 and 19 which are connected across the resistor 13 to bypass the resistor 13 and increase the current through the relay 12 sufficiently to actuate the relay 12. Normally open contacts 20 of the relay 12 are connected between the cathode of the SCR 11 and the contact 17 for completing a bypass circuit from the anode to the cathode of the SCR 11 when the relay 12 is actuated and the switch 10 is depressed. Completion of the bypass circuit connects the anode of the SCR 11 to the cathode to remove the forward bias and change the SCR 11 from its conductive state to its nonconductive state.

Any number of contacts may be operated by the relay 12 to actuate external loads as the circuit operates. The SCR relay flip-flop circuit may be used, for example, to operate a device 23 and a light bulb 24. The relay 12 has contacts 21 which operate the device 23 and contacts 22 which operate the light bulb 24 to indicate that the device 23 is operating.

OPERATION

Initially, the silicon controlled rectifier 11 is forward biased by the source 14 but is nonconductive. Depressing the switch 10 applies a positive voltage from the source 14 through the contact 16, and the bar 15, and the contact 17 to the control electrode of the SCR 11 to render the SCR conductive. Current thus passes from the voltage source 14 to the SCR 11, the relay 12, and the resistor 13. Since this current is limited by the resistor 13 to a magnitude insufficient to actuate the relay 12, the relay 12 remains unactuated. When the pushbutton 10 is released, the bar 15 engages contacts 18 and 19 to bypass the resistor 13. With the resistor 13 bypassed, the current through the relay 12 becomes large enough to actuate the relay 12 to close contacts 20, 21, and 22.

When the pushbutton 10 is again depressed with the SCR 11 in a conductive state and the relay 12 in an actuated condition, the bar 15 engages contacts 16 and 17 to bypass the SCR 11 through contacts 20 of the relay 12 to render the SCR 11 nonconductive. Upon subsequent release of the pushbutton 10, the current through the relay 12 and resistor 13 is interrupted to deactuate the relay 12. Deactuation of the relay 12 shuts off the device 23 and the light bulb 24 by opening the contacts 21 and 22. Also, contacts 20 are opened by the deactuation of the relay 12 to condition the SCR relay flip-flop circuit for another cycle of operation.

COUNTER CIRCUIT

Figure 2:
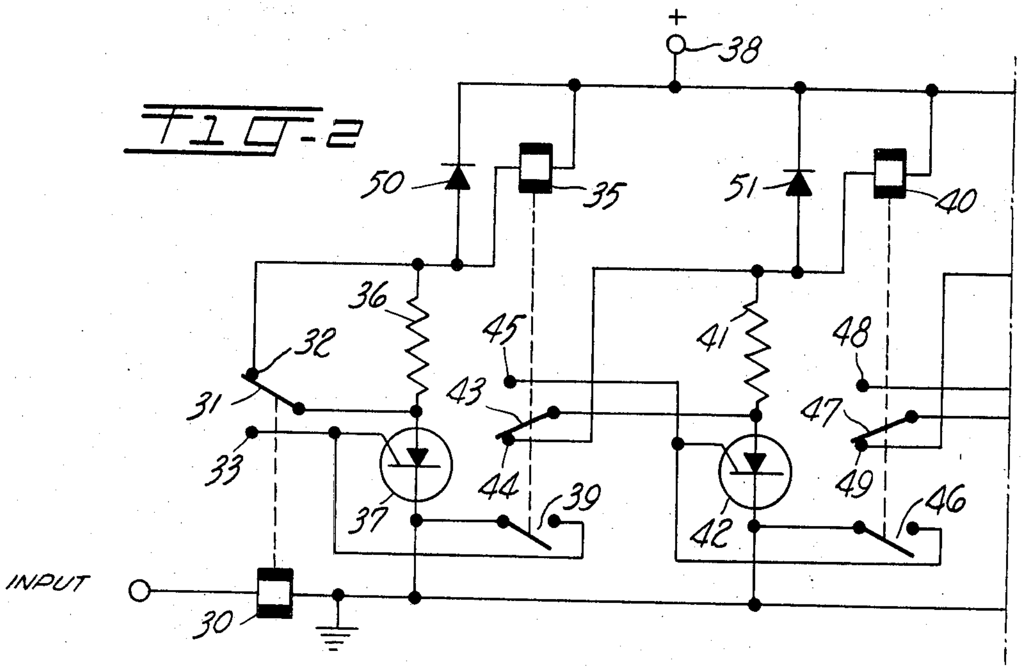
FIG. 2 is a schematic drawing of a counter circuit constructed in accordance with the invention.

Several of the flip-flop relay switches may be connected together to form a binary counter such as that shown in FIG. 2. The pushbutton switch 10 of FIG. 1 is replaced by a relay 30 having a contact arm 31 which engages a contact 32 when the relay 30 is unactuated and engages a contact 33 when the relay 30 is actuated. The first stage of the binary counter includes a relay 35, a resistor 36, and an SCR 37, all serially connected across a DC voltage source 38 to forward bias the anode-cathode, transconductive path of the SCR 37. The value of the resistor 36 is chosen to limit the current through the relay 35 to a value less than the current required to actuate the relay 35 and greater than the current required to maintain the relay 35 actuated.

The contact arm 31 is connected to a junction of the resistor 36 and the anode of the SCR 37, and the contact 33 is connected to the control electrode of the SCR 37 such that when the relay 30 is actuated and the contact arm 31 engages the contact 33, the SCR 37 is rendered conductive. The contact 32 is connected to an end of the resistor 36 opposite to the anode of the SCR 37 so that the resistor 36 is bypassed when the relay 30 is deactuated to allow the current through the relay 35 to increase sufficiently to actuate the relay 35. Normally open contacts 39 of the relay 35 are connected between the contact 33 and the cathode of the SCR 37 such that when the relay 35 is actuated and the contact arm 31 engages contact 33, the SCR 37 is bypassed to remove the forward bias and render the SCR 37 nonconductive.

The second stage of the counter shown in FIG. 2 includes a relay 40, a resistor 41, and an SCR 42, all serially connected across the voltage source 38 to forward bias the SCR 42. Like the pushbutton switch 10 of FIG. 1, the relay 35 may be switched between two conditions. 10 of FIG. 1, the relay 35 may be switched between two conditions. A contact arm 43 of the relay 35 engages a contact 44 when the relay 35 is in the first condition, that is, unactuated, and engages a contact 45 when the relay 35 is actuated, the second condition. The contact arm 43 is connected to a junction of the resistor 41 and the anode of the SCR 42, and the contact 45 is connected to the control electrode of the SCR 42 for initiating conduction through the SCR 42 when the relay 35 is actuated. The resistor 41 limits the current through the relay 40 to a value less than the actuating current but greater than the holding current of the relay 40. The contact 44 is connected to an end of the resistor 41 opposite to the junction with the anode of SCR 42 for bypassing the resistor 41 when the relay 35 is deactuated to increase the current and actuate the relay 40. Normally open contacts 46 of the relay 40 are connected between the anode of the SCR 42 and the contact 45 for bypassing the SCR 42 when the relays 40 and 35 are both actuated to remove the forward bias and change the SCR 42 from its conductive to its nonconductive state.

The relay 40 may have a contact arm 47 and contacts 48 and 49 connected to additional stages of the counter circuit. To avoid erroneously triggering the SCRs 37 and 42 when the currents through relays 35 and 40 are interrupted and voltages are induced across the relays 35 and 40, diodes 50 and 51 are connected across relays 35 and 40 to bypass the induced voltages.

OPERATION

Initially, in the operation of the counter circuit, the SCRs 37 and 42 are forward biased by the voltage source 38 but are in nonconductive states. When the relay 30 is actuated by an input pulse, the contact arm 31 engages contact 33 to apply a triggering voltage to the control electrode of the SCR 37 to render the SCR 37 conductive. Current then passes through resistor 36 and relay 35 which is insufficient in magnitude to actuate the relay 35. Upon release of the relay 30, the contact arm 31 engages contact 32 to bypass resistor 36 which results in an increase in the current through relay 35 sufficient to actuate the relay 35. Actuation of relay 35 moves contact arm 43 into engagement with contact 45 to apply a triggering voltage to the control electrode of the SCR 42. Since the current through the relay 40, resistor 41, and the SCR 42 is insufficient to actuate the relay 40, the relay 40 remains unactuated.

When a second input signal is applied to the relay 30, the contact arm 31 engages the contact 33 to connect the anode of the SCR 37 to the cathode of the SCR 37 through contacts 39 which are closed due to the actuation of relay 35. The SCR 37 is bypassed and the SCR 37 is changed from its conductive to its nonconductive state. Upon release of the relay 30 and the disengagement of the contact arm 31 with the contact 33, the current through the relay 35 is interrupted to release the relay 35. When the relay 35 is released, the contact arm 43 engages contact 44 to bypass the resistor 41 and actuate the relay 40. Actuation of the relay 40 closes contacts 46 to connect the cathode of the SCR rectifier 42 to the contact 45. Also actuation of the relay 40 operates the contact arm 47 connected to a succeeding stage in the counter.

The actuation and release of the relay 30 by a third input signal again actuates the relay 35. The contact arm 43 engages contact 45 to bypass the SCR 42 through the closed contacts 46 to change the SCR 42 from its conductive to its nonconductive state. The relay 40 remains actuated.

A fourth input signal causes the release of both relays 35 and 40 by the actuation and release of relay 30. The release of relay 35 opens the bypass circuit through contact 44 and contact arm 43 to interrupt the current flow through the relay 40.

It is to be understood that the above described embodiments are simply illustrative of the invention and that many other embodiments can be devised without departing from the scope and spirit of the invention.

I claim:

1. In an apparatus for controlling the operating condition of a bistable device having first and second states:
- thyratronlike gating means comprising a normally disabled transconductive path and a control electrode;
- means for normally forward-biasing the transconductive path including means for switching the states of the bistable device and a discrete impedance connected in series with the transconductive path, the path being enabled by energizing the control electrode when the transconductive path is forward biased and thereafter disabled by disabling the forward biasing means;
- first normally unoperated control means connected to the forward-biasing means and to the bistable device, the first control means being operable when the bistable device is in the first state for energizing the control electrode to enable the transconductive path and further operable when the bistable device is in the second state for disabling the forward biasing means by short-circuiting the transconductive path through the bistable device;
- second normally unoperated control means coupled to the forward-biasing means and operable when the transconductive path is enabled for shunting the discrete impedance, the switching means being responsive to the shunting of the discrete impedance for switching the bistable device from the first state to the second state and thereafter responsive to the disabling of the transconductive path for switching the bistable device from the second state to the first state; and
- means for selectively operating the first and second control means alternately.

2. A bistable circuit, which comprises:
- an electronic switch having a transconductive path and a gating electrode, wherein a trigger potential applied to the gating electrode initiates conduction in the transconductive path when the latter is biased in a forward direction, the gating electrode thereafter relinquishing control until conduction in the path is extinguished by removing the forward bias;
- a relay having an operating winding and normally open relay contacts, said relay characterized by a first predetermined operating current through the winding and a second minimum predetermined holding current through the winding;
- means for forward-biasing the transconductive path including a discrete impedance connecting the transconductive path of said electronic switch in series with the operating winding the effective resistance of said discrete impedance being normally such that when the path has been triggered into its conductive state the current through said operating winding is less than the operating current but greater than the holding current in the relay;
- a disabling circuit, including the normally open relay contacts, connectable to said transconductive path to remove said forward bias only if the relay contacts are closed by short-circuiting the transconductive path through the closed relay contacts;
- first control means coupled to said forward biasing means and operable for shunting the discrete impedance to increase the current in the operating winding to at least the value of the operating current of the relay to close the relay contacts;
- second control means coupled to said forward biasing means and operable for applying a trigger potential to the gating electrode if the relay contacts are open and for connecting said disabling circuit to said transconductive path, whereby the forward bias is removed if the relay contacts are closed; and
- means for selectively operating said first and second control means alternately.

3. A bistable circuit comprising:

a thyratronlike electronic device having a transconductive path and a control electrode, the transconductive path having conductive and nonconductive states;

means actuated when the magnitude of current therethrough increases above a first magnitude for producing an output signal, said signal producing means remaining actuated until the magnitude of current therethrough falls below a second magnitude lower than the first magnitude;

means for forward-biasing the transconductive path including an impedance connected in series with the path and the signal producing means the impedance limiting the magnitude of current through the signal producing means when the path is in its conductive state to a magnitude greater than the second magnitude and less than the first magnitude; and switching means coupled to the forward-biasing means and operable;

a. upon a first actuation for applying a trigger potential to the control electrode of the electronic device when the path is forward-biased for switching the path from the nonconductive state to the conductive state if the signal producing means is unactuated, b. upon a first deactuation after the first actuation for shorting out the impedance to operate the signal producing means;

c. upon a second actuation after the first deactuation for removing the forward bias from the path to switch the path back from the conductive state to the nonconductive state when the signal producing means is actuated and for maintaining the magnitude of current in the signal producing means at a value between the first and second magnitude during the second actuation; and d. upon a second deactivation of the switching means after the second actuation for interrupting the current through the signal producing means and thereby deactivating the signal producing means.

4. A bistable circuit comprising;

means for connection to a voltage source;

an electronic device having at least three electrodes wherein:

a. a first and second electrode are connected in series with the voltage connecting means;

b. the device is triggered from a nonconductive state between the first and second electrodes into a conductive state between the first and second electrodes when a predetermined voltage is applied to the third electrode; and c. the device is returned to its nonconductive condition when the predetermined voltage is applied to the second electrode;

a relay having a winding connected in series with the voltage sources and the first and second electrodes and having a pair of normally open contacts associated therewith, wherein:

a. a first of the pair of contacts is connected to the second electrode, b. the contacts are closed when a first predetermined magnitude of magnetic flux is produced in the winding;

c. the contacts are opened when the magnetic flux falls below a second predetermined magnitude which is less than the first predetermined magnitude;

means connected in series with the voltage source, the winding, and the first and second electrodes for limiting the magnitude of the magnetic flux in the winding to a flux less than the first predetermined magnitude and greater than the second predetermined magnitude; and switching means for applying a voltage equal to the predetermined voltage to the first electrode and the second contact of the pair of contacts upon actuation and for shorting out the flux limiting means when deactuated, whereby a first actuation of the switching means triggers the device into the conductive state and a second actuation following the deactuation of the switching means returns the device to its nonconductive state by applying the predetermined voltage to the second electrode through the closed pair of contacts.

5. A bistable circuit as defined in claim 4, wherein:

the electronic device is a silicon controlled rectifier; and the magnetic flux limiting means is a resistor.

6. A counting circuit comprising n bistable circuits, each as defined in claim 4, wherein the switching means of the nth bistable circuit is operated by the relay in the $(n-1)^{th}$ bistable circuit.